United States Patent
Laufer

[15] 3,671,593
[45] June 20, 1972

[54] PROCESS FOR MAKING THIOPHENOL

[72] Inventor: Robert J. Laufer, Colts Neck, N.J.

[73] Assignee: Consolidation Coal Company, Pittsburgh, Pa.

[22] Filed: Jan. 26, 1970
[21] Appl. No.: 5,952

Related U.S. Application Data

[63] Continuation-in-part of Ser. No. 693,185, Dec. 26, 1967, abandoned.

[52] U.S. Cl. .................................260/609 D, 260/668 R
[51] Int. Cl. .............................................C07c 149/28
[58] Field of Search .....................................260/609 D

[56] References Cited

FOREIGN PATENTS OR APPLICATIONS 296,986   3/1917   Germany ..........................260/609 D

OTHER PUBLICATIONS

Pryor, " Mechanisms of Sulfur Reactions," p. 117 (1962).

*Primary Examiner*—Joseph Rebold
*Assistant Examiner*—D. R. Phillips
*Attorney*—D. Leigh Fowler, Jr. and Stanley J. Price, Jr.

[57] ABSTRACT

An improved process for making thiophenol wherein high yields of thiophenol are obtained by reacting cyclohexane with a sulfurizing agent at a temperature above 350° C.

8 Claims, No Drawings

PROCESS FOR MAKING THIOPHENOL

CROSS-REFERENCE TO RELATED APPLICATION

This application is a continuation-in-part of application, Ser. No. 693,185, filed Dec. 26, 1967 now abandoned and assigned to the assignee of the present application.

BACKGROUND OF THE INVENTION

1. Field of the Invention

The present invention relates to an improved process for making thiophenol.

2. Description of the Prior Art

Thiophenols have been obtained in poor yields by the reaction of hydrocarbons with sulfurizing agents (see German Pat. No. 296,986, issued Mar. 14, 1917; U. S. Pat. Nos. 2,402,685 and 2,490,257). The reaction products generally include mercaptans, thioethers and disulfides (see U. S. Pat. No. 2,411,236). When cyclohexane is the hydrocarbon reactant, benzene is also one of the principal products (see pages 117 et seq. of *Mechanisms of Sulfur Reactions* by W. A. Pryor, Mac-Graw-Hill Book Co., 1962). Sulfur and sulfur-forming agents are powerful oxidants and, accordingly, effect dehydrogenation of hydrocarbons at elevated temperatures, for example 300° C. or above (see especially pages 94 to 96 and 117 to 119 of the aforementioned Pryor's *Mechanisms of Sulfur Reactions*). In the aforementioned German Pat. No. 296,986, a process is described which comprises reacting cyclohexane with sulfur at a temperature between 200° and 300° C. and an elevated pressure, for example, 50 to 100 atmospheres for a period of 24 to 48 hours. The patent expressly limits the upper end of the temperature range to 300° C. The highest yield of thiophenol reported in the patent is 12.8 percent.

SUMMARY OF THE INVENTION

In accordance with the present invention, a continuous process is provided for making thiophenol in high yields which comprises reacting cyclohexane with a sulfurizing agent selected from the class consisting of sulfur and sulfur chlorides at a temperature above 350° C.

Preferably, the temperature is between 350° and 650° C., the pressure is approximately atmospheric, and the residence time is less than five minutes. If sulfur is the sulfurizing agent, the temperature is preferably between 375° and 525° C., and the residence time is preferably less than two minutes. The temperature of the reaction is sufficiently high to maintain a substantial part or all of the reactants in the vapor phase. Higher pressures than atmospheric may be used, but are not required. Neither are catalysts required.

The cyclohexane is preferably in excess of that stoichiometrically required to react with the sulfurizing agent to produce thiophenol. For example, in the case of sulfur as the sulfurizing agent, the equation is as follows:

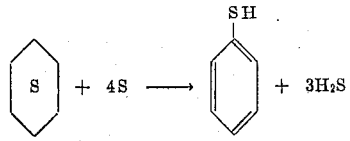

The reaction of cyclohexane and sulfur to form thiophenol requires a cyclohexane-to-sulfur weight ratio of 0.65. Ratios below 1.0 are not desirable because of the well-known oxidative property of sulfur which converts thiophenol to phenyl disulfide. In fact, even at a ratio of 1.0, some loss of thiophenol occurs, in contrast to ratios of 1.3 and above where little or no loss is apparent. Accordingly, the preferred range of cyclohexane to sulfur weight ratios is from 1.0 to 3.0, with the optimum from 1.3 to 2.0. It is desirable to operate at a combination of residence time and temperature which result in essentially complete conversion of sulfur. Such operation simplifies product recovery and refining because elemental sulfur can precipitate from the crude reaction mixture and foul the recovery system.

Thiophenol and benzene are the principal products in the case of the reaction between cyclohexane and sulfur under the foregoing conditions, with little or no by-products. The yield of thiophenol produced under the conditions of this invention is generally in excess of 40 percent. This substantial increase in yield of thiophenol is surprising in view of the thermal instability of thiophenol [see M. G. Rudenko and V. N. Gromova. Doklady Akad. Nauk S.S.S.R. 81, 207–9(1951)] and the oxidative properties of sulfur and sulfur-producing agents which tend to convert thiophenol to more stable products like benzene, diphenyl sulfide, diphenyl disulfide and heterocyclic sulfur compounds. Furthermore, it is believed to be clear that none of the prior workers recognized the significance of temperature in the selective production of thiophenol, particularly when coupled with residence time.

For a better understanding of my invention, reference should be had to the following examples of the preferred embodiment of my invention.

EXAMPLE 1

Thiophenol from Cyclohexane and Sulfur at 500° C.

The reactor consisted of a stainless steel pipe approximately 4 cm. I.D. × 76.5 cm. long, packed with stainless steel turnings to provide a total free space of 780 milliliters. The pipe was mounted vertically in a furnace and temperatures were measured at four points in the center of the packing. Cyclohexane was fed from a pressurized feed tank through a flow meter and needle valve to a vaporizer. The latter was coupled directly to the top of the reactor. Liquid sulfur, heated to about 140° C., was fed to the top of the reactor from a heated stainless steel syringe, driven by a constant-speed motor. Effluent vapors from the reactor were condensed and collected in a flask to which was attached a reflux condenser and a series of cold traps. Hydrogen sulfide was vented to an exhaust hood.

Cyclohexane was continuously fed to the vaporizer at 27.2 grams per minute. The vapors were heated to about 500° C. and passed into the reactor. Sulfur was then continuously fed at 7.2 grams per minute. After a line-out period, the reactor operated with a temperature gradient from top to bottom of 420° to 520° C. The pressure was substantially atmospheric. The liquid product was distilled and the various fractions were analyzed by gas chromatography and by infrared spectroscopy.

Results were as follows:

| | |
|---|---|
| Conversion of sulfur, % | 81.0 |
| Conversion of cyclohexane, % | 7.4 |
| Residence time (seconds) | 1.3 |
| Yields, % of theory based on converted sulfur: | |
| Thiophenol | 52.0 |
| Benzene | 44.0 |
| Yields, % of theory based on converted cyclohexane: | |
| Thiophenol | 47.0 |
| Benzene | 53.0 |

Residence Time (as used in all the examples) is calculated by dividing the free space in the reactor by the volume of total reactants fed per second at reaction temperature (assuming sulfur is nonatomic).

According to qualitative infrared analysis, a minor amount of a contaminant, probably cyclohexyl mercaptan, was included in the thiophenol. Only trace amounts of other products were detected. A similar experiment in which the cyclohexane feed rate was lowered to 13.8 grams per minute gave essentially complete conversion of the sulfur and similar yields to those reported above.

EXAMPLE 2

Thiophenol from Cyclohexane and Sulfur Monochloride

A ½-inch-diameter Vycor tube, packed with 32 ml. of 10 × 28 mesh quartz granules, was heated in a tube furnace at 500° C. A 30 percent by weight solution of sulfur monochloride in cyclohexane was continuously fed to the reaction tube at approximately 0.5 ml. per minute for 6.5 hours. The pressure was substantially atmospheric. The residence time was 4 seconds. Liquid product was condensed and collected and the hydrogen chloride-hydrogen sulfide off-gas was vented. From 39.6 grams of sulfur monochloride and 113.3 grams of cyclohexane were obtained 10.0 grams of thiophenol, 8.3 grams of benzene, and 70.4 grams of unconverted cyclohexane. The yield of thiophenol was 41.3 percent of theory, based on the equation:

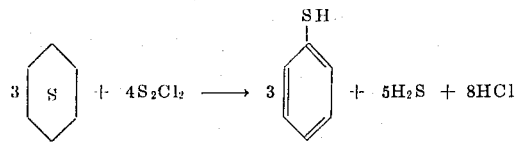

cally heated vessel packed with ceramic Raschig rings. Since the reaction between sulfur and cyclohexane is endothermic, the cyclohexane was generally preheated to a temperature above the reaction temperature to allow for its drop in temperature upon reaction. At temperatures above 600° C., the cyclohexane tends to coke, which is why 600° C. is set as the preferred upper limit of temperature. The residence time was changed by changing rates of flow and also reactor volume. In all runs, the weight ratio of cyclohexane to sulfur was 1.6.

In Runs 11–13, cyclohexane and sulfur were vaporized and preheated to the reaction temperatures by passage through preheaters inserted in a molten salt bath at the temperature shown. The vapors were mixed in a tubular reactor similarly heated in a molten salt bath.

The conditions and results of the runs are tabulated in the following table.

TABLE II

| | Temperature, ° C. | | | | | | | | | | | | |
|---|---|---|---|---|---|---|---|---|---|---|---|---|---|
| | 350 | | 375 | | 400 | | | 450 | | | 485 | 515 | 525 |
| Run Number | 1 | 2 | 3 | 4 | 5 | 6 | 7 | 8 | 9 | 10 | 11 | 12 | 13 |
| Residence time, sec | 10 | 38 | 19 | 38 | 10 | 19 | 38 | 10 | 19 | 38 | 1.9 | 1.5 | 1.2 |
| Cyclohexane conv., percent | 4.3 | 13.2 | 22.2 | 29.0 | 30.5 | 45.1 | 43.0 | 42.2 | 55.1 | 43.3 | 50 | 54 | 47.6 |
| Sulfur conversion, percent | 34.0 | 37.3 | 30.7 | 42.6 | 83.8 | 100 | 100 | ~97.5 | 100 | 100 | ~100 | ~100 | ~100 |
| Yield of thiophenol based on sulfur fed, percent of theory | 2.2 | 7.9 | 12.2 | 22.0 | 20.5 | 41.9 | 50.1 | 43.3 | 46.7 | 48.1 | 42.6 | 45.3 | 32 |
| Yield of benzene based on sulfur fed, percent of theory | | 7.8 | 9.7 | 16.4 | 23.8 | 21.1 | 29.4 | 23.8 | 27.4 | 21 | 31.6 | 26 | |

Only minor or trace amounts of products other than thiophenol and benzene were formed. If the reaction is conducted at lower temperatures and/or shorter reaction times, substantial quantities of cyclohexyl chloride may be recovered from the reactor effluent.

EXAMPLE 3

Thiophenol from Cyclohexane and Sulfur Dichloride

A series of experiments were carried out in the manner described in Example 2 using various proportions of sulfur dichloride and cyclohexane, with the results reported in the following table:

TABLE I

| Experiment Number | Wt. % $SCl_2$ in Feed | Wt. % Thiophenol in Liquid Product |
|---|---|---|
| 1 | 20 | 5.0 |
| 2 | 30 | 9.2 |
| 3 | 40 | 16.1 |
| 4 | 50 | 27.7 |

EXAMPLE 4

Thiophenol from Cyclohexane and Sulfur—Study of Effect of Temperature and Residence Time A series of runs were conducted to determine the effect of temperature and residence time upon the yield of thiophenol.

The experimental procedure for Runs 1 to 10 inclusive was as follows: Liquid cyclohexane was fed to a salt bath heated vaporizer where the cyclohexane was vaporized and the vapor temperature raised to reaction temperature. Liquid sulfur at a temperature slightly above its melting point was mixed with the cyclohexane by passing both streams through a pipe tee into a pipe leading to the reactor. The reactor was an electri-

EXAMPLE 5

Sulfur vapor and cyclohexane vapor (wt. ratio of cyclohexane to sulfur, 1.6) were superheated to 630° C. and mixed in a mixing tee. The mixed vapors were conducted into an adiabatic reactor where they cooled down to 525° C. at the top of the reactor due to the endothermic heat of reaction. The residence time in the reactor was 2.7 seconds. Sulfur feed rate was 4.79 grams/minute and cyclohexane rate was 7.8 grams/minute. The yield of thiophenol was 34 percent of theory based on sulfur fed. The yield of benzene was 17.0 percent based on sulfur fed. Sulfur consumption was 100% and cyclohexane conversion was 56.7 percent.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated.

I claim:

1. The process for making thiophenol which comprises continuously feeding cyclohexane and a sulfurizing agent selected from the class consisting of sulfur and sulfur chlorides to a reaction zone, maintaining said cyclohexane and said sulfurizing agent at a temperature above 350°C. in said reaction zone, and continuously removing thiophenol from said reaction zone, said reaction being conducted in vapor phase.

2. The process according to claim 1 in which the temperature of the reaction zone is between 350° and 650° C., and the residence time is less than five minutes.

3. The process according to claim 2 in which the pressure is substantially atmospheric.

4. The process according to claim 2 in which the reaction is conducted in the absence of any added catalyst.

5. The process for making thiophenol which comprises continuously feeding cyclohexane and a sulfurizing agent selected from the class consisting of sulfur and sulfur chlorides to a reaction zone, the weight ratio of the cyclohexane to the sulfurizing agent being in excess of that stoichiometrically required for the cyclohexane to react with the sulfurizing agent to produce thiophenol, maintaining said cyclohexane and said sulfurizing agent at a temperature above 350° C. in said reaction zone, and continuously removing thiophenol from said reaction zone, said reaction being conducted in vapor phase.

6. The process according to claim 5 in which the sulfurizing agent is sulfur and the weight ratio of cyclohexane to sulfur is between 1 and 3.

7. The process according to claim 6 in which the weight ratio of cyclohexane to sulfur is between 1.3 and 2.

8. The process according to claim 7 in which the temperature is between 375° and 525° C. and the residence time is less than 2 minutes.

* * * * *